(12) United States Patent
Hummel et al.

(10) Patent No.: US 7,020,601 B1
(45) Date of Patent: *Mar. 28, 2006

(54) METHOD AND APPARATUS FOR PROCESSING SOURCE INFORMATION BASED ON SOURCE PLACEABLE ELEMENTS

(75) Inventors: Jochen Hummel, Alexandria, VA (US); Iko Knyphausen, Lake Forest Park, WA (US)

(73) Assignee: Trados Incorporated, Sunnyvale, CA (US)

(*) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 09/071,900

(22) Filed: May 4, 1998

(51) Int. Cl.
*G06F 17/28* (2006.01)

(52) U.S. Cl. .................. 704/2; 704/1; 704/5; 704/8; 704/9; 704/10; 715/536; 707/6

(58) Field of Classification Search .............. 704/1–10; 707/530, 536, 540, 500, 513, 6; 715/536; 709/203, 218
See application file for complete search history.

(56) References Cited

U.S. PATENT DOCUMENTS

| 5,224,040 | A | * | 6/1993 | Tou ............................. 704/2 |
| 5,974,371 | A | * | 10/1999 | Hirai et al. ................... 704/2 |
| 6,139,201 | A | * | 10/2000 | Carbonell et al. ............. 704/2 |

* cited by examiner

*Primary Examiner*—David D. Knepper
*Assistant Examiner*—Qi Han
(74) *Attorney, Agent, or Firm*—Banner & Witcoff LTD (57) ABSTRACT

The present invention provides an improved method and apparatus for translating a source language to a target language. The invention uses placeables (e.g., proper nouns, titles and names, dates, times, units and measurements, numbers, formatting information, such as tags or escape sequences, styles, graphics, hyperlinks) to assist a translator by not having to retype information that does not need to be translated and to provide conversions to the target locale if necessary like for speeds.

19 Claims, 4 Drawing Sheets

|  410 | 420 | 430 |
|---|---|---|
| Token text | Classification | Transformation |
| A man | text | - |
| called | text | - |
| Mr. Miller | Placeable / Name w/Title | Herr Miller |
| left his apartment on the | text | - |
| 25th of January | Placeable / Date – long form | 25. Januar |
| in a car that is c.... | text | - |
| 160 mph | Placeable / number w/ unit | 260 km/h |

FIG. 4

| 510 | 520 | 530 |
|---|---|---|
| Token text | Classification | Transformation |
| Ein Mann | text | - |
| namens | text | - |
| Herr Ungermann | Placeable / Name w/Title | irrelevant |
| verliess sein Apartment.. | text | - |
| 1. April | Placeable / Date – long form | irrelevant |
| in einem Auto, dass.... | text | - |
| 160 km/h | Placeable / number w/ unit | irrelevant |
| fahren kann. | text | - |

FIG. 5

METHOD AND APPARATUS FOR PROCESSING SOURCE INFORMATION BASED ON SOURCE PLACEABLE ELEMENTS

BACKGROUND OF THE INVENTION

1. Field of the Invention

The present invention relates to machine processing of text and language and, more particularly, to a method and apparatus including a software implementation for machine-assisted translation or machine translation.

2. Discussion of the Related Technology

Translation of text from one language to another is often a tedious task requiring the efforts of a skilled translator. Soon after the advent of computers, researchers began to use computers as an aid for natural language translation. The earliest machine translation (MT) systems relied on large bilingual dictionaries where entries for words of the source language (SL) gave one or more equivalents in the target language (TL). It quickly became apparent that dictionary rules for syntax and grammar were so complex that experts could not develop a comprehensive set of rules to describe the language. These problems have proven so intractable that many efforts at machine translation have been abandoned.

Throughout the world, multilingual cultures and multinational trade create an increasing demand for translation services. The demand for translation of commercial and technical documents represents a large and growing segment of the translation market. Examples of such documents are contracts, instruction manuals, forms, and computer software. Often when a product or service is "localized" for a new market, a great deal of documentation must be translated, creating a need for cost-effective translation. Because commercial and technical information is often detailed and precise, accurate translations continue to be in demand.

Machine translation (MT) systems are usually classified as either direct, transfer-based, or interlingua-based. In the direct approach, there are no intermediate representations between the source language and the target language. The source language text is processed "directly" in order to transform it into the target text. This process is essentially a word-to-word translation with some adjustments. This approach is not followed by any MT system at present due to a perceived weakness attributable to ignoring all aspects of the internal structure of sentences.

In the transfer-based approach, information from the various stages of analysis from the source text is transferred to the corresponding stages of the generation of the target text. For example, transfer is achieved by setting up correspondence at the lexical level, at the grammatical level, or at the level of the structure built by the grammar, and so forth. The transfer method operates only on a particular pair of languages and, therefore, must be specifically and painstakingly created for each pair of languages.

The interlingua-based approach depends upon an assumption that a suitable intermediate representation can be defined such that the source text can be mapped into the intermediate representation which can then be mapped into the target text. In principle, this approach is clearly attractive because, unlike the transfer-based approach, it is not necessary to build a separate transfer program for each pair of languages. However, it is not clear whether a truly language-independent intermediate representation can be devised. Current interlingua-based systems are much less ambitious about their claims to the universality of the intermediate representation. For a high-quality translation, it is often necessary to have access to some particular aspects of the source and target languages.

In the transfer-based approach, there have been some recent advances. In the development of mathematical and computational models of grammar, there is increasing emphasis on locating syntactic as well as semantic information directly with the lexical items by associating structures with the lexical items and defining operations for composing these objects. From this perspective, all the information particular to a language is encapsulated in the lexical items and the structures associated with them. Different languages will be distinguished at this level, but not with respect to the operations for composing these structures, which are the same for all languages. The idea, then, is to define all bilingual correspondence at this level. It remains to be seen whether this approach can be carried out among a variety of different languages.

Some existing MT systems require that documents be written in highly constrained texts. Such systems are useful for preparing manuals in different languages. Here, the system is really not translating a manual written in one natural language into a set of other natural languages, but rather is generating multilingual texts from a highly constrained text, thus avoiding many problems in conventional MT.

Recently, research has focused on ways of using machines to assist human translators rather than to autonomously perform translations. This approach is referred to as machine-assisted human translation (MAHT). Systems are available that produce high-quality translation of business correspondence using pre-translated fragments with some translations filled in by human translators. An example of a machine-assisted translation tool is a translation memory (TM) system. Translation memory systems leave the creative work to the translator, however they can learn from the translator, and they actively support the translation process by automatically suggesting existing translations and terminology. A translation memory is a database that collects translations as they are performed, along with the source language equivalents. After a number of translations have been performed and stored in the translation memory, the translation memory can be accessed to assist new translations where the new translations include identical or similar source language text as had been included in the translation memory.

The advantage of such a system is that it can, in theory, leverage existing MT technology to make the translator more efficient without sacrificing the traditional accuracy provided by a human translator. The system makes translations more efficient by ensuring that the translator never has to translate the same source text twice. While a translator works, translation memory operates in the background to 'learn' original sentences and their corresponding translations. In the process, this data may be linked into the neural network. Later, translation memory rapidly finds identical similar sentences and automatically displays them as a working basis for creating a new translation. Thus, translation memory ensures that no sentence need be translated twice.

Translation memories are most useful when they are able to locate not only identical matches, but also approximate or "fuzzy matches." Fuzzy matching facilitates retrieval of text that differs slightly in word order, morphology, case, or spelling. The approximate matching is necessary because of the large variety possible in natural language texts. Fuzzy matching to find sentences with similar content has seen its performance perfected by the implementation of neural network technology. The translator has the option of choosing among alternative translations in addition to the one automatically suggested by memory. Along with the source sentence and its translation, each translation unit can also store information on users, dates and frequency of use, and classifying attributes and text fields. This information enables easy maintenance of translation memories, which naturally become quite large over time.

Concordances are another tool commonly used by translators. Electronic concordances are files having text strings, i.e., words, phrases or sentences, that are matched with the context in which the word appeared in a particular document. When a translator is unsure of the meaning to be given a particular word, the concordance can demonstrate how the word is used in several different contexts. This information allows for a more proper selection of translations to accurately reflect the meaning of a source language document. Electronic concordances include text searching software that allows the translator to extract all text strings in a library that include a desired word or phrase. The extracted texts strings can be examined quickly to gain a greater understanding of how a particular word or phrase is used in context.

Multilingual natural language processing represents a growing need and opportunity in the field of international commerce and communication. Machine-assisted translation tools are needed to make document translation more efficient and less costly. Furthermore, machine-assisted translation tools are needed that efficiently leverage the large amount of stored knowledge available as pre-translated commercial and technical documents. Specifically, a need exists for a translation memory tool that is language-independent and provides accurate, rapid fuzzy retrieval of pre-translated material.

Up until now, text that was considered to be a placeable had to be translated and manually entered by the translator. Placeables are often re-used "as is" in the translated text or in a converted form. Examples of such placeables are: proper nouns, titles and names, dates, times, units and measurements, numbers, formatting information, such as tags or escape sequences, styles, graphics, hyperlinks, cross-references, automatic fields in text, or any other kind of information that will not be translated but, rather, converted without knowledge about the context. The translation of placeables is time-consuming and can lead to errors when conversions must be made for things such as currency, e.g., dollar to yen and speed, e.g., miles per hour may to kilometers per hour. There is a need for a program that identifies the text considered to be placeable, makes any necessary conversions, and inserts the placeable into the target text.

SUMMARY OF THE INVENTION

The present invention provides an improved method and apparatus for translating a source language into a target language. The invention uses placeables to assist a translator by facilitating the automatic or semiautomatic replacement of placeables in the target language and making any necessary conversions according to the target locale, e.g., "German—Standard". A placeable as used herein is a term that designates data that does not require translation into a target language or, in some cases, data types that are particularly suitable for semiautomatic replacement (e.g., proper nouns, titles and names, formatting information, such as tags or escape sequences, styles, graphics) and data requiring a translation that does not change the context of the data (e.g., physical and currency units, time zones, date formats, hyperlinks etc.). In addition, a placeable may be more complex and advanced. For example, a placeable could be determined by specialized dictionaries and/or the context or environment information of the entire information designated for translation, e.g., data in the chemical environment, automotive environment, music lyrics, legal environment. The context or environment information would then decide how certain terms are translated. A source placeable identifier may be used to identify the placeables in the source information, e.g., source locale, based on source concordance relating to the context and environment of the placeable. In translation memories, the placeable may be converted into a language-independent format, e.g., meta-representation. The language-independent format allows the translation memory to convert the placeable into any target language because the format is common to all locales. After conversion to the independent format, the placeable can be automatically or semiautomatically placed in the target translation. A target placeable converter is used to convert the placeables into target information, e.g., target locale, based on target concordance relating to the context and environment of the placeable.

A system, according to the invention, may identify a placeable and determine its type in order to facilitate subsequent handling of the placeable, typically to facilitate a decision on placing, converting, or translating the placeable. The identification of a placeable and determination of its type may be accomplished by a rule-based process. In addition, the identification and determination process may be performed by or with the assistance of a finite state machine such as table lookup functions or a character by character determination.

In database-driven TMs using this invention, there is a high potential to reduce the amount of storage space needed to store the source and target units in pairs by storing the units as templates, or skeletons, together with the placeable information.

An object of the invention is to reduce the effort required of a translator to translate source information into target information by eliminating the need to manually type or move the placeable to a translation by allowing placeables to be inserted in the target information and to perform any desired conversions by means of a target placeable converter.

Another object of the invention is to reduce the amount of time or effort required to translate source text by automatically converting placeables, e.g., dates, measurement units into target text for insertion.

Another object of the invention is to reduce errors that may occur when a translator is manually converting measurement units in a source text to a target text by automatically converting placeable data.

Another object of the invention is to reduce the amount of time or effort required to translate source text by automatically identifying formatting codes and inserting the codes into a target text.

Another object of the invention is to reduce the amount of time or effort required to translate a source text into a target text by automatically translating hypertext links.

Another object of the invention is to convert the placeables into a language-independent format.

An object of the invention is to automatically change the appearance of placeable elements if appropriate, for example, by converting measurement units, date formats, currency values and units, titles and names, etc.

An object of the invention is to semiautomatically insert placeable elements at a user-defined position in the target text upon interaction from the user, e.g., upon one or more keystrokes, upon one or more spoken commands, upon mouse clicks, etc., when translating source information.

An object of the invention is to automatically insert placeable elements, with the help of reference material or other machine-computable information, that allow the machine to determine the position for the insertion without user interaction.

An object of the invention is that it can be used with manual translation or with a translation memory.

DETAILED DESCRIPTION OF THE PREFERRED EMBODIMENT

The present invention may be carried out by a variety of commercially available language translation computer software programs. The invention can work with a translation memory, however, it is not a requirement. Advantageously, the system will support at least two languages.

First, the system can receive input source translation information, such as text data or voice data, that may be entered or retrieved in various ways, (e.g., data file, scanned data, voice recording, voice dictation, etc.). The program may divide the source translation information into linguistic forms or data translation units. This can be accomplished by segmenting the source translation information into words, sentences, or paragraphs. This process can be system-designated or user-designated.

Manual Translation

Figure 1:
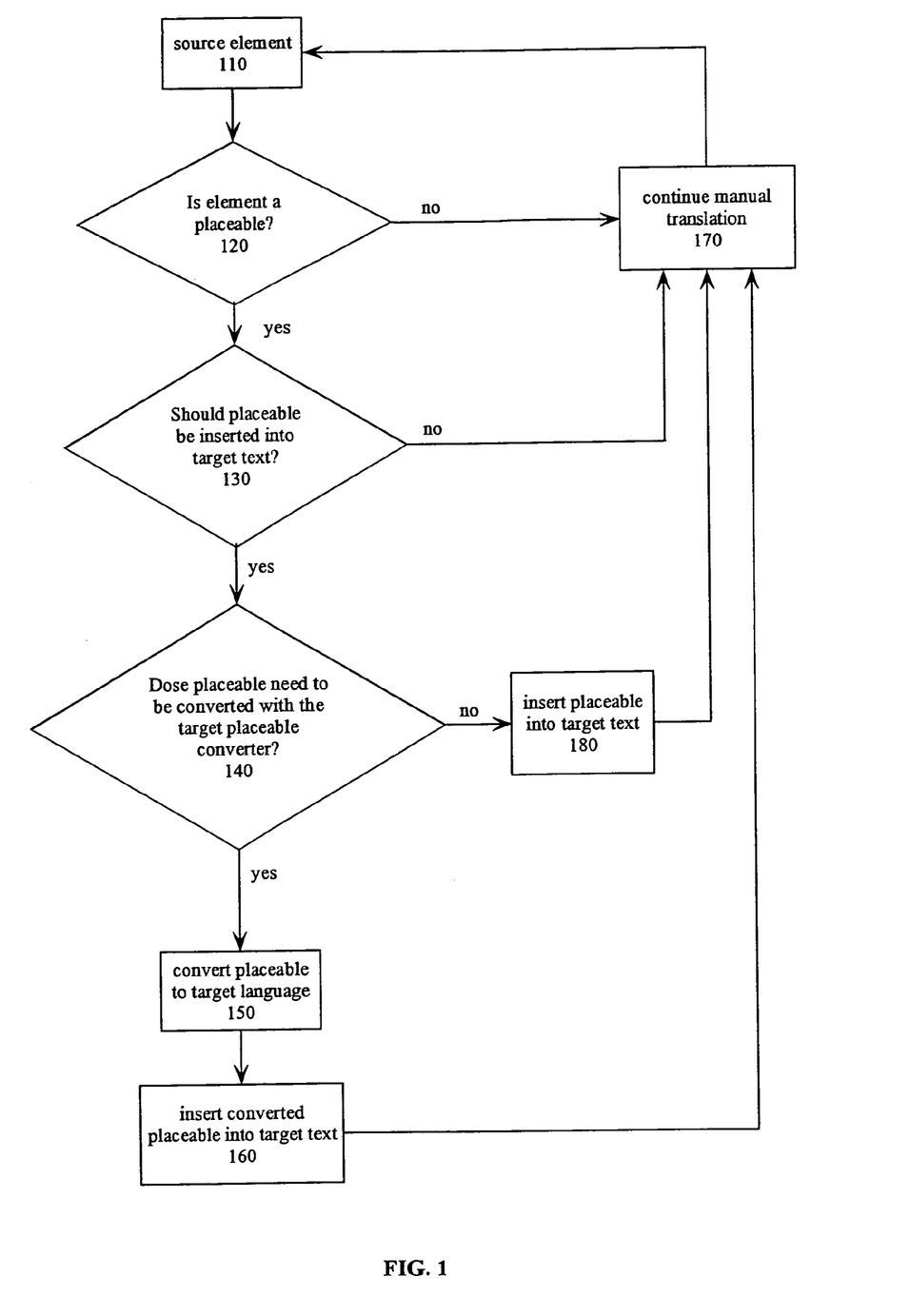
FIG. 1 shows an embodiment of the invention.

FIG. 1 shows a flow chart illustrating a process according to the invention when a translator is not using a translation memory. Initially, input source translation information may be divided into segments, such as sentences. Elements of the segments are provided to the processor at location (110). The system determines whether an element is considered a placeable (120). While translating the text, the system will advise the translator that a data element is a placeable and will allow the translator to have this placeable inserted into the target text (130). At this point, the system may also determine the type of placeable in order to assist the translator. The type information may be provided to the translator in any suitable format, such as by a leading signal, color, font change, etc. In this method, the translator may determine where the placeable should be inserted, e.g., upon one or more keystrokes, upon one or more spoken commands, upon mouse click(s), etc. If the placeable requires a conversion to the target information, this system may be set to automatically convert the placeable based on type, when the user selects to drop the placeable into the target text (140). This conversion is performed by a target placeable converter according to location information of the target output (e.g., target locale, target dictionaries based on target environment/context). The manual translation may be performed in a Windows environment.

Translation Memory

Figure 2:
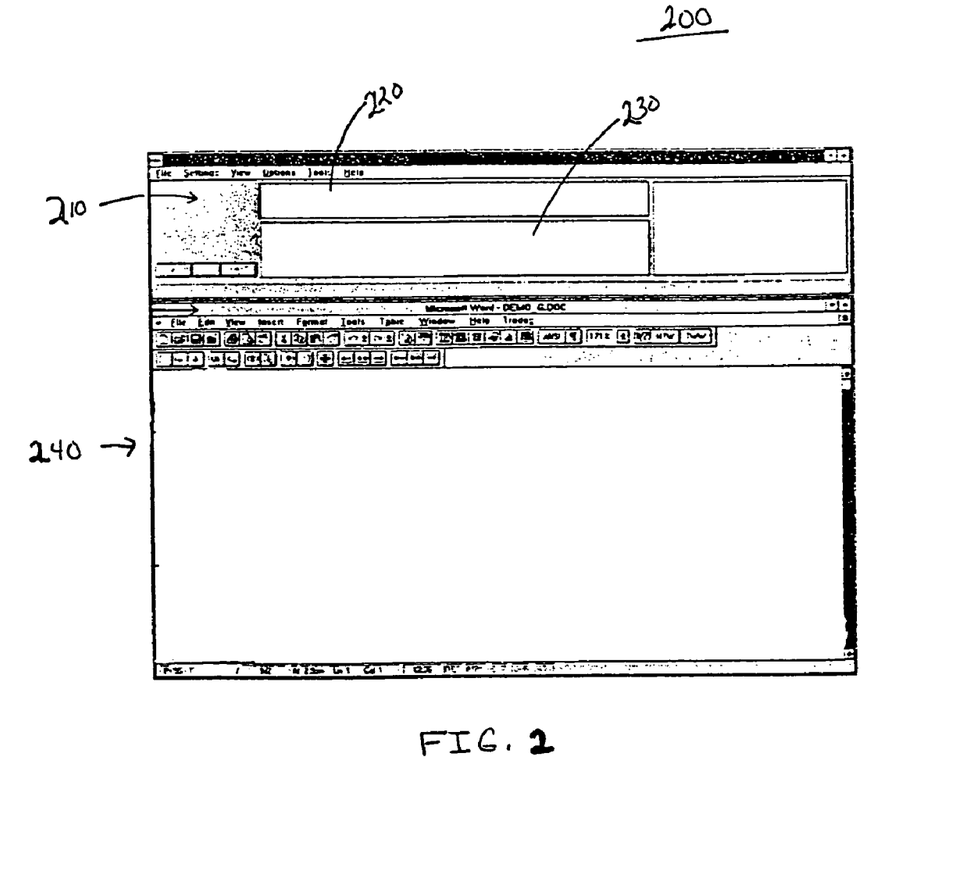
FIG. 2 shows another embodiment of the invention.

Translation memories are used for reference purposes when translating information. FIG. 2 shows a commercially available software program for managing reference material for translation when using a translation memory. The reference material may be collections of text, normally in two or more languages, whereby previously translated source text units are associated with target text units. The input designated for translation will be referred to as source translation information. As mentioned above, translation memories are most useful when they are able to locate not only identical matches, but also approximate or "fuzzy matches." Fuzzy matching facilitates retrieval of text that differs slightly from the source translation information. The translation memory can provide information to the translator that indicates how close the retrieved suggested information matches the source translation information. This information could be disseminated in the form of a numerical representation such as a percentage. In the event that a unit of text (i.e., source translation information) to be translated is identical, or very similar, to a source text unit occurring in the translation memory and which has been accurately translated at an earlier time, a retrieval system can show as a reference the translation stored in the translation memory as target text. The translator can then copy this reference unit and modify it to fit the new source translation information. In prior systems, if a placeable, occurring in the text to be translated, was different from a corresponding element of the translation memory source text, it would be necessary for a translator to manually transfer and, if necessary, translate or convert placeable data into the target information.

The user interface of the translation software provides a program window (200) for displaying different items for the translator. This particular example shows the translation software program window (210) and a word processor's program window (240) at the same time so that the user can view the entire source translation information, or smaller units of interest, during the translation process. Item (240) can also be configured to display the final target information, e.g., the translated text, during the translation process. Item (210) shows an area (220) where the translation program may display the linguistic form or data translation unit of the source translation information designated for translation. In addition, window (210) may display some suggested translations for the linguistic form when using a translation memory tool (230).

Figure 3:
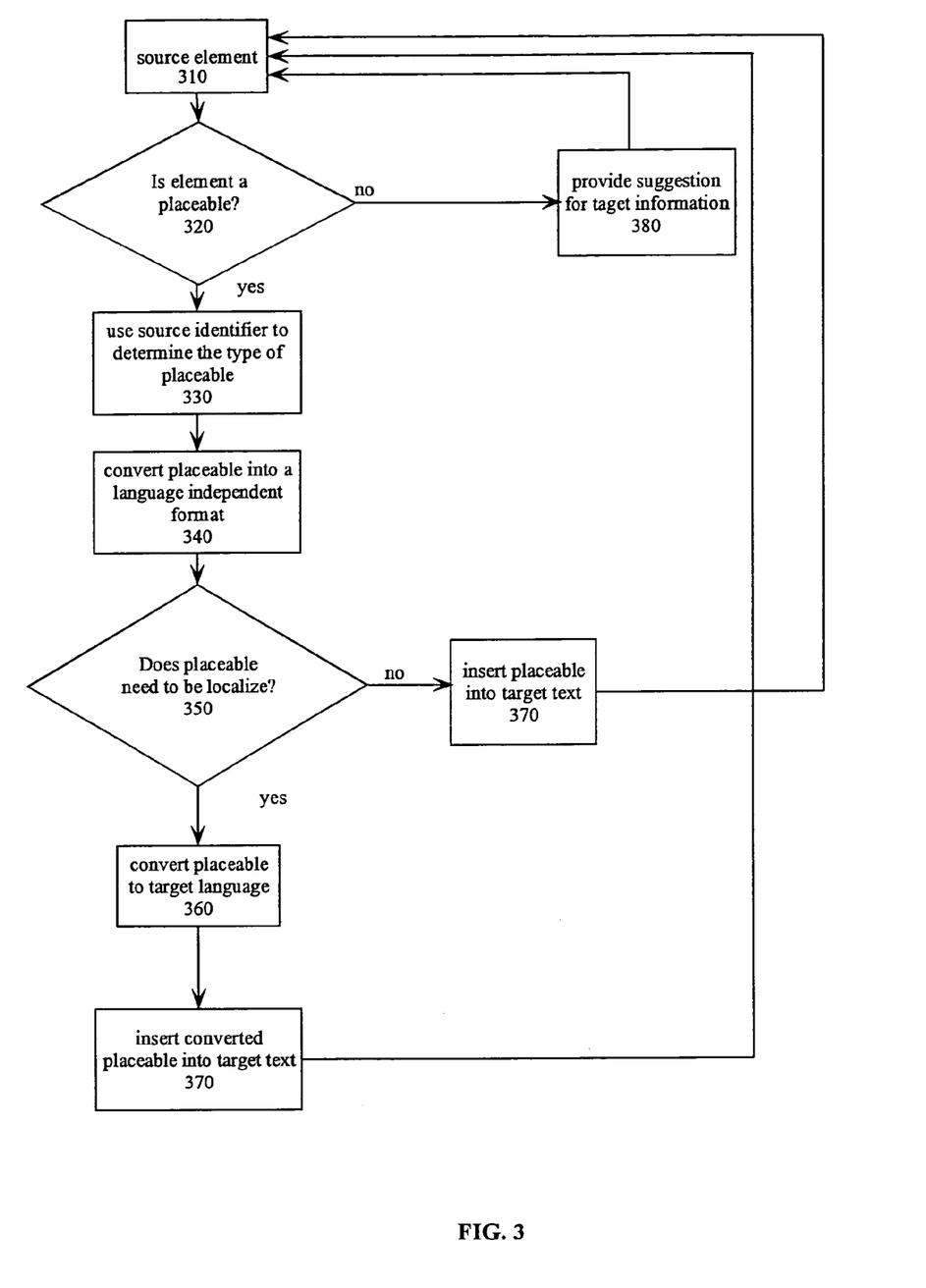
FIG. 3 shows another embodiment of the invention.
Figure 4:
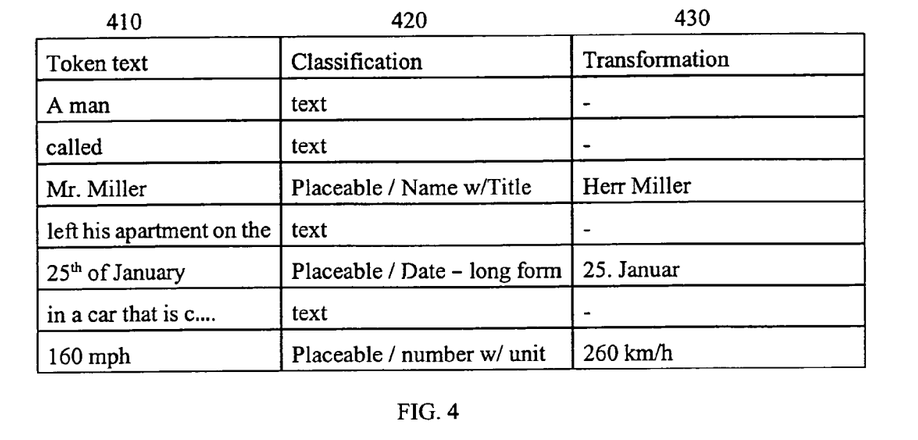
FIG. 4 shows another embodiment of the invention.
Figure 5:
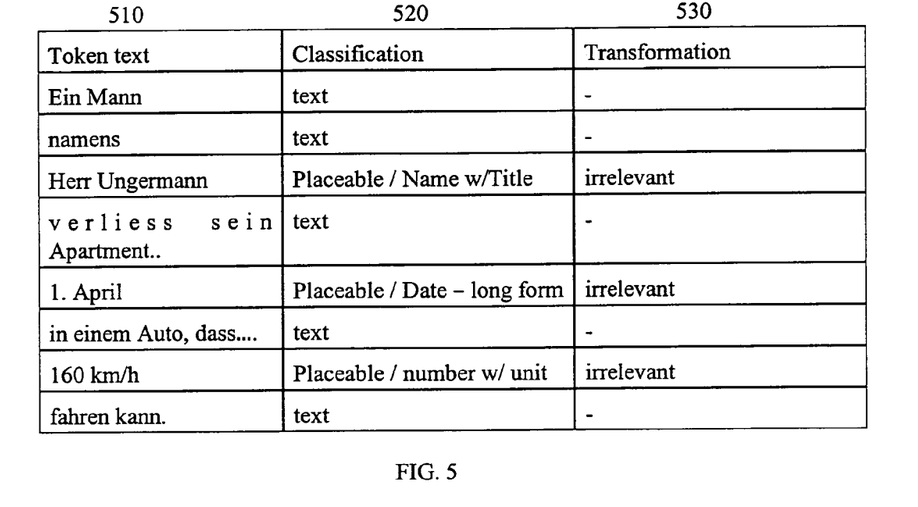
FIG. 5 shows another embodiment of the invention.

FIG. 3 and FIG. 5 illustrate the invention when a translator is using a translation memory. First, the linguistic units of source translation information may further be divided into tokens or source elements. Once a source element is identified as a placeable (310), its type is determined (330) (i.e., date, time, link, etc.), and the placeable may then be converted into a language independent format (340), such as a meta-representation, or directly converted into a target language or locale. The meta-representation (420, 520) allows the system to convert the placeable into any target language because the format (meta-representation) is common to all locales. The meta-representation can be converted according to any target locale to produce a target placeable (360). At this point, the placeable may be inserted into the target language and any conversion may be made automatically or semiautomatically.

Consider the following sentence: "A man, called Mr. Miller, left his apartment on the $25^{th}$ of January in a car that is capable of driving at speeds above 160 mph." A machine translation program would face great difficulties in determining whether "A man called Mr. Miller on the phone" or whether "A man" is the same person as "Mr. Miller." This question can only be answered by evaluating the context. In other words, if one were to look at the word "called" alone, it would be virtually impossible to translate the sentence correctly. However, if the entire token (410) is considered: "A man, called Mr. Miller," then you (or a machine) could come up with a meaningful translation. FIG. 3 shows how the invention processes this sentence and how a placeable would be treated the first time it was identified. Three placeables are identified: Mr. Miller, 25$^{th}$ of January, and 160 mph.

| Identified Placeable | Classification & language-independent formatting | Transformation to be inserted in the target text |
|---|---|---|
| Mr. Miller | Placeable/Name w/Title | Herr Miller |
| 25$^{th}$ of January | Placeable/Date-long form | 25. Januar |
| 160 mph | Placeable/number w/unit | 260 km/h |

When the system is presented with the foregoing text as part of an input of text to be translated (e.g., source translation information), the system will first segment the text, preferably into sentences. The foregoing sentence may then advantageously be tokenized. According to one embodiment of the invention, it can be tokenized into elements corresponding to the words or phrases in the source translation sentence. The tokenizing process will consider whether the elements may be identified as placeables according to a rule-based query and/or with the use of finite state tools such as look-up tables. Next, the type of the element identified as a placeable will be determined. This determination may also be accomplished by a rule-based inquiry and/or with the use of a finite state process such as by tables. The output of the tokenizer will include the non-placeable elements and an indication of the type of any placeable elements. This output may be provided to a translation memory in order to locate any identical or similar segments that have been previously translated. The system may propose a translation based on the previously translated target text located in the translation memory and direct placement with or without conversion of the placeable elements. The system may advantageously be implemented by software in a general purpose computer such as a personal computer.

The determination of a placeable may be a one or two step method using a rule-based system/a finite state system. The one-step method may also be accomplished by determining the type using a rule-based system that views the entire token. For example: is this token a date, is this token a proper noun, is this token a hyperlink? The two step-method may first determine whether the token is a placeable and then determine its type. This may be accomplished using a finite state process that examines each character of a token one at a time until a determination is reached.

One of the identifying features of a placeable is that its meaning is not likely to vary by context. Such placeables may include types that may be directly used in a translation, for example, numbers or graphics. Other types of placeables may be used after conversion, such as numbers coupled with units. For example, a placeable appearing as "62 miles per hour" may be converted to "100 kilometers per hour". Such a conversion is distinguished from a translation by its formulaic nature. A formulaic conversion is suitable in situations where context is not likely to affect the translation.

The following example illustrates the translation of text including a similar placeable in another source text. The translation memory system includes the following source text unit plus its translation from the reference file(s):

Translation Memory Source Text Unit: "A man, called Mr. Smith, left his apartment on the 1st of April in a car that is capable of driving at speeds above 100 mph."

Translation Memory Target Text Unit (German): "Ein Mann, namens Herr Smith, verliess sein Apartment am 1. April in einem Auto, das schneller als 160 km/h fahren kann."

New Text Unit to be translated is: "A man, called Mr. Miller, left his apartment on the 25$^{th}$ of January in a car that is capable of driving at speeds above 160 mph."

As shown in FIG. 5., the new source text unit may be divided into elements (510). The placeables may then be classified and converted to a language-independent format (520). When the software is able to correlate three placeables in the Translation Memory Target Text Unit with placeables in both the Translation Memory Source Text Unit and the New Text to be translated, a translation memory system using this invention can determine and propose the location for inserting the placeables automatically, that is, without any user interaction. In the above example, the system will be capable of determining that:

I. The only difference between the Text Unit (to be translated) and the Translation Memory Source Text Unit (a similar text that has been translated earlier) is found in three tokens.
II. All three tokens are placeables.
III. The type (i.e., date, speed, name) of the placeable tokens are the same in Translation Memory Source Text Units and the text to be translated.
IV. In the Old Target Text Unit, exactly the same number and type of placeable tokens can be found. The translation system may propose to reuse the previous translation (Translation Memory Target Text Unit) and replace the placeable tokens with the new name (=Mr. Miller), the new date (=25$^{th}$ January), and the new speed (=160 mph).
V. The software may convert certain parts of the placeables depending on the type. In this example: "Herr Miller", "25. Januar", and "280 km/h" (330).

Storing Placeables

There are two types of translation memory systems on the market today: reference file driven TMs and database driven TMs. Reference file driven TMs keep the source text and target text in two different locations, aligning the two by keeping a list of reference pointers to each other. In reference file driven systems, all source text units ever written (or otherwise created), and all translations thereof, may be physically stored and kept in files. In database driven TMs using this invention, there is a high potential to conserve data storage space by simply storing the text units as templates or skeletons.

We claim:
1. A method for processing input source information comprising the steps of:
parsing the input source information into elements;
identifying an element within said input source information as a source placeable element by predetermined criteria based on the content of the element;
designating the identified source placeable element by type;
identifying stored information that is substantially similar to said input source information;
comparing the type of the identified source placeable element to a type of a corresponding portion of the identified stored information for identifying a match of type of elements;

converting at least a portion of said source placeable element into a target placeable element;

replacing the portion of the identified stored information in a corresponding location in the identified stored information with the converted target placeable element if the match of type of elements is identified; and outputting the identified stored information containing the converted target placeable element.

2. A method for processing source information according to claim 1, further comprising the step of:

determining a source locale.

3. A method for processing source information according to claim 2, further comprising the step of:

applying a source placeable identifier to determine a type of said source placeable element.

4. A method for processing source information according to claim 2, further comprising the step of:

applying said source locale to determine said element by type.

5. A method for processing source information according to claim 1, further comprising the step of:

determining a target locale.

6. A method for processing source information according to claim 1, further comprising the steps of:

designating a type of said source placeable element;

applying a target placeable converter to convert said type of said source placeable element.

7. A method for processing source information according to claim 1, further comprising the step of:

converting said source placeable element into a language-independent format.

8. A method for processing source information according to claim 1, further comprising the steps of:

determining whether said source placeable element is a proper noun;

placing said source placeable element directly into a target output.

9. A method for processing source information according to claim 1, further comprising the steps of:

determining whether said source placeable element is a date;

converting said date into a target information according to a target locale information.

10. A method for processing source information according to claim 1, further comprising the steps of:

determining whether said source placeable element is a proper noun;

converting said source placeable element into a language independent format.

11. A method for processing source information according to claim 1, further comprising the steps of:

determining whether said source placeable element is a proper noun;

converting said source placeable element into a meta-representation.

12. A method for processing source information according to claim 1, further comprising the steps of:

determining whether said source placeable element is a date;

converting said source placeable element into a language independent format.

13. A method for processing source information according to claim 1, further comprising the step of:

determining whether said source placeable element requires conversion.

14. A method for processing source information according to claim 1, further comprising the step of:

determining output requirement for conversions.

15. A method for processing source information according to claim 1, wherein converting at least a portion of said source placeable element requires a calculation for converting a source currency into a target currency, said calculation for converting is automatic.

16. A method for processing source information according to claim 1, wherein converting at least a portion of said source placeable element requires a mathematical calculation, said mathematical calculation is automatic.

17. A computer driven language processing system for processing input source information comprising:

a parser for parsing the input source information into elements;

an element identifier, connected to an output of said parser, the element identifier for identifying an element as a source placeable element by predetermined criteria based on the content of the element;

a type designator, connected to an output of said element identifier, the type designator for designating the identified source placeable element by type a processor for identifying stored information that is substantially similar to said input source information and comparing the type of the identified source placeable element to a type of a corresponding portion of the identified stored information for identifying a match of type of elements;

a placeable converter for converting at least a portion of said source placeable element into a target placeable element, wherein the portion of the identified stored information is replaced with the converted target placeable element in a corresponding location if the match of type of elements is identified; and an output for outputting the identified stored information containing the converted target placeable element.

18. A computer driven language processing system for processing source information comprising:

a parser for parsing source information into elements;

an element identifier identifying placeable elements by a predetermined criteria based on the content of the elements;

a type designator for designating said placeable elements by type; and a placeable converter, wherein stored information that is substantially similar to said source information is identified, the type of said placeable element is compared to the type of a corresponding portion of the identified stored information for identifying a match of type of elements and the portion of the identified stored information in a corresponding location in the identified stored information is replaced with the converted target placeable element if the match of type of elements is identified.

19. A method for processing source information comprising the steps of:

parsing input source information into elements;

identifying a source placeable element by predetermined criteria based on the content of the source placeable element;

designating the identified source placeable element by type;

identifying stored information that is substantially similar to said input source information;

comparing the type of the identified source placeable element to a type of a corresponding portion of the identified stored information for identifying a match of type of elements;

calculating at least a portion of said source placeable element into a target placeable element, said calculating comprising converting said source placeable element from a first unit of measure into a second unit of measure; and replacing the portion of the identified stored information with the converted target placeable element at a corresponding location in the identified stored information if the match of type of elements is identified.

* * * * *

UNITED STATES PATENT AND TRADEMARK OFFICE
CERTIFICATE OF CORRECTION

PATENT NO. : 7,020,601 B1
APPLICATION NO. : 09/071900
DATED : March 28, 2006
INVENTOR(S) : Jochen Hummel et al.

It is certified that error appears in the above-identified patent and that said Letters Patent is hereby corrected as shown below:

On title page, References Cited section item (56), U.S. Patent Documents:
Please insert the following references:

| | | | |
|---|---|---|---|
| -- | 4,916,614 | 04/1990 | Kaji et al |
| | 4,962,452 | 10/1990 | Nogami et al |
| | 5,005,127 | 04/1991 | Kugimiya |
| | 5,020,021 | 05/1991 | Kaji et al |
| | 5,093,788 | 05/1992 | Shiotani et al |
| | 5,497,319 | 03/1996 | Chong et al |
| | 5,548,508 | 08/1996 | Nagami |
| | 5,587,902 | 12/1996 | Kugimiya |
| | 5,640,575 | 06/1997 | Maruyama et al |
| | 5,819,265 | 10/1998 | Ravin et al |
| | 5,848,386 | 12/1998 | Motoyama |
| | 5,895,446 | 04/1999 | Takeda et al |
| | 5,917,484 | 06/1999 | Mullaney |
| | 5,960,382 | 09/1999 | Steiner |
| | 5,974,413 | 10/1999 | Beauregard et al |
| | 6,623,529 | 09/2003 | Lakritz -- |

On title page, References Cited section item (56), Foreign Patent Documents:
Please insert the following references:
--WO 94/06086    03/1974
EP 0668558    08/1995--

On title page, References Cited Section item (56), Other Publications:
Please insert the following references:
--Harakda K et al.: "Machine translation software for the internet" Sanyo Technical Review, Oct. 1996, Sanken Electric Co., Japan, vol. 28, no. 2, pages 66-74, XP002112717 ISSN: 0285-516X, abstract figure 5
Anonymous: "Method to make a translated text file have the same printer control tags as the original text file" IBM Technical Disclosure Bulletin, vol. 32, no. 2, pages 375-377, XP0000334640 New York, US page 1, line 1-page 3, line 17
EP 0 262 938, British Telecom, 4-6-88, col. 5, line 7-14; col. 5, line 44-col.6, line 21; col.6, line 46-line 54

UNITED STATES PATENT AND TRADEMARK OFFICE
CERTIFICATE OF CORRECTION

PATENT NO. : 7,020,601 B1
APPLICATION NO. : 09/071900
DATED : March 28, 2006
INVENTOR(S) : Jochen Hummel et al.

It is certified that error appears in the above-identified patent and that said Letters Patent is hereby corrected as shown below:

International Search Report for PCT/EP99/02959, mailed 2 Sept. 1999
Trados Translator's Workbench for windows, 1994-1995, Trados GmbH, Stuttgart, Germany, pages 9-13 and 27-96--

Signed and Sealed this

Eighth Day of August, 2006

JON W. DUDAS
*Director of the United States Patent and Trademark Office*